Patented June 19, 1928.

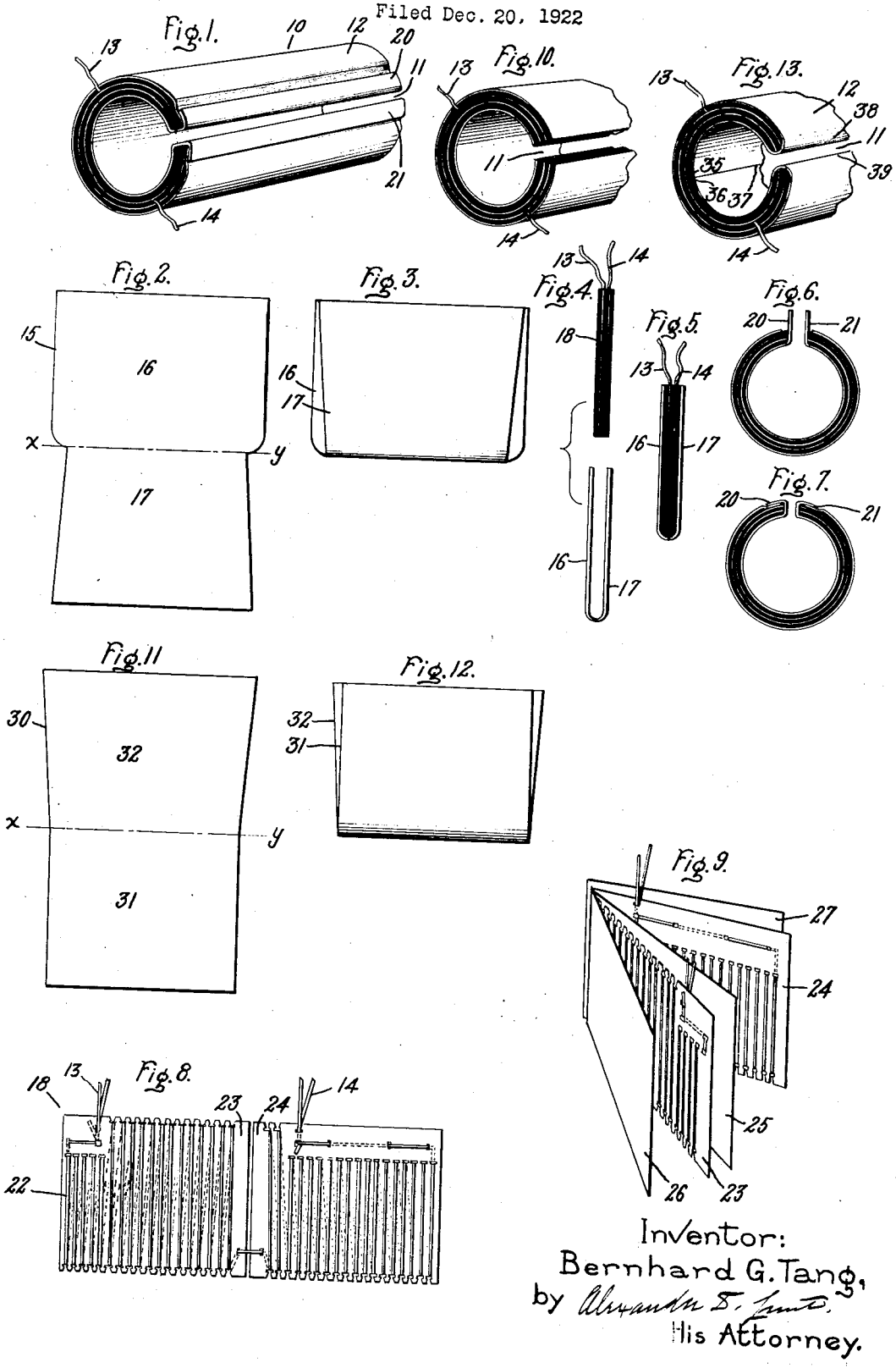
June 19, 1928.                                                          1,674,488
B. G. TANG
ELECTRIC HEATING UNIT
Filed Dec. 20, 1922
Inventor:
Bernhard G. Tang,
by *Alexander S. [signature]*
His Attorney.

1,674,488

UNITED STATES PATENT OFFICE.

BERNHARD G. TANG, OF SCHENECTADY, NEW YORK, ASSIGNOR TO GENERAL ELECTRIC COMPANY, A CORPORATION OF NEW YORK.

ELECTRIC HEATING UNIT.

Application filed December 20, 1922. Serial No. 607,941.

My invention relates to electric heating units and has for its object the provision of a simple, reliable and efficient electric heating unit and one which may be manufactured at a low cost.

More specifically my invention relates to electric heating units of the type adapted to be inserted in a suitable aperture in the member to be heated or slipped over the member to be heated. It has been proposed to make these heating units in tubular form with a longitudinal slot which, by analogy to a pipe, may be considered as an open seam. One advantage of a heating unit made in this form is that it is resilient to a certain extent so that it may be sprung in place, and secured when released by its own resiliency.

In accordance with one method of constructing heating units of this form, a section of metal tubing, forming a sheath, is first flattened and then an insulated resistance conductor is secured between the sides of the flattened tubing. The heating unit as thus assembled is lastly formed into an open seam tube. Heating units constructed in this manner, however, are relatively expensive due to the cost of the tubing from which the sheath is formed.

In carrying out my invention I form the sheath from a suitably developed blank or sheet of metal, thus avoiding the use of the relatively expensive tubing.

For a better understanding of my invention reference should be had to the accompanying drawing in which Fig. 1 is a perspective view of an electric heating unit embodying my invention; Fig. 2 is a plan view of a blank or sheet of metal from which the sheath is formed; Figs. 3, 4, 5, 6 and 7 are views showing successive steps in the construction of the heating unit shown in Fig. 1; Figs. 8 and 9 are views showing the construction of the heating element; Figs. 10, 11 and 12 are views showing a modified form of my invention; while Fig. 13 is a fragmentary perspective view of another modified form of my invention.

Referring to Fig. 1 of the drawing, the heating unit 10 in one form of my invention is tubular in form and has a longitudinal slot or open seam 11. The heating units is provided with a sheath 12 made of a suitable heat conducting material, such as copper. It will be observed that this sheath has the form of a double walled, resilient tubular member having a longitudinal slot or open seam. Between the walls of the tubular member forming the sheath is secured a suitable flat heating element. The sheath is open at one end from which project the terminals 13 and 14 for the heating element. Such a heating unit has the advantage that it need not be manufactured accurately to size since it may be contracted or expanded, by virtue of the slot or open seam 11, so as to be slipped in place either into an aperture in the heated member, as in the case of the well known cartridge heating unit, or over the heated member as, for example, when used on a soldering iron. The heating unit may be secured on the heated member by its own resiliency or it may be secured by suitable clamping means. It is therefore capable of being brought into close contact with the member to be heated whereby a good heat conducting relation is secured between the unit and the heated member. As thus secured, it is impossible for the unit to be loosened by vibration. Obviously, the heating unit may take many forms other than tubular; for example, it may have a rectangular or triangular cross-section.

One of the features of my invention is the provision of a simple, reliable and economical construction for the sheath 12. In accordance with my invention I form the sheath from a suitably shaped metallic sheet or blank made of a suitable heat conducting metal, such as copper. In one form of my invention the metallic sheet or blank 15 from which the sheath is formed (Fig. 2) comprises a substantially rectangular portion 16 and a portion 17 having a width somewhat less than portion 16. The portion 17 gradually increases in width from the junction along the line $xy$ with portion 17 toward its outer end. In constructing the heating unit, the sheet 15 is first folded along the line $xy$, as shown in Fig. 3, so that the two folded portions 16 and 17 are parallel, and then a suitable flat heating element 18, having terminals 13 and 14, is inserted between the folded portions 16 and 17 (Fig. 4) and the folded portions compressed on it, as shown in Fig. 5.

The heating unit, as shown in Fig. 5, has now been assembled, and it remains to shape the unit into the desired resilient form, such as the tubular form shown in Fig. 1. In giving the heating unit this tubular form, it is bent so as to form an open seam tube having its axis at right angles to the fold along the line xy. The fold thus comes at one end of the sheath, closing it. The heating unit is also bent in such direction that the portion 17 forms the outer wall.

It will be observed that the bending operation stretches the outer wall or portion 17 at the junction along the line xy, this tendency to stretch gradually decreasing toward the outer end of portion 17. It is to compensate for this tendency to stretch that the width of portion 17 is gradually increased toward the end. The increase in width is such that after the heating unit has been formed, the adjacent or abutting edges of portion 17 along the slot 11 will be substantially parallel.

Since the portion 16 is wider than the portion 17, and also since the circumference of the inner wall formed by portion 16 is less than the circumference of the outer wall, it will be observed that the edges of portion 16 along slot 11 will project beyond the corresponding edges of portion 17. After the unit has been formed, these projecting edges 20 and 21 of portion 16 (Fig. 6) are bent outward and over tightly on the outer wall, as shown in Fig. 7. In this manner the edges of the sheath along slot 11 are tightly sealed. It will be observed that the projecting edges 20 and 21 are the sides of portion 16 (Fig. 2).

Referring to Figs. 8 and 9, the heating element 18 in one form of my invention comprises a ribbon-like resistance conductor 22 which is mounted in suitable slots or holes, on two rectangular insulating sheets 23 and 24 made of suitable insulating material, such as mica. Preferably the zig-zag lengths of the resistance conductor, formed as it is passed back and forth in being wrapped on the sheets, extend substantially crosswise of the sheets. In assembling the heating element, the two sheets 23 and 24, having the resistance conductor mounted on them, are folded together with an insulating sheet 25 between them and insulating sheets 26 and 27 placed at their respective outer sides, as shown in Fig. 9. The insulating sheets 25, 26 and 27 are made of a suitable insulating material, such as mica. As shown the terminals 13 and 14 extend from the top of the heating element and are spaced apart.

As thus formed, the heating element, when placed between the folds 16 and 17, as shown in Figs. 4 and 5, is in such position that the crosswise lengths of the resistance conductor are at substantially right angles to the fold along line xy. It will thus be observed that after the unit has been formed, these lengths of the resistance conductor extend longitudinally of the heating unit. This is an important feature of my invention, for I have found that if the resistance conductor should extend circumferentially of the tubular heating unit, the inner lengths would be loosened as the unit is being formed into a tube and would thus have a tendency to be crowded together into contact with each other whereby sections of the heating element would be short-circuited. A flat ribbon-like resistance conductor, as shown, has the advantage that there is little danger of its cutting through the mica insulating sheets during the forming of the heating unit. Obviously, round or other shaped resistance conductors may be used, however, by selecting a suitable insulating material.

In the modified form of my invention shown in Figs. 10, 11 and 12, the sheath 12 is closed only at one end, the heating unit being open along the slot 11. In this form of my invention the sheet 30 from which the sheath is formed is provided with a rectangular section 31 and a wider section 32 gradually increasing in width from the junction along the line xy, the section 32 having the same width as section 31 at the junction. The construction of this modification of my invention is similar to the construction of the heating unit disclosed in Figs. 1 to 7 inclusive and will be understood from the description of the latter. The sheet 30 is first folded along the line xy, as shown in Fig. 10, after which the heating element is inserted between the folded portions and the unit as thus assembled then formed into a tube having an axis at right angles to the fold, as shown in Fig. 10. In shaping the heating unit the portion 32 of the sheet forms the outer wall while the rectangular portion 31 forms the inner wall. In this form of my invention the portion 31 is not wide enough to provide overlapping edges to close the sheath along the slot 11.

The forms of my invention shown in Figs. 1 and 10, having one end closed by the fold, are particularly adapted for use in electrically heated soldering irons. In using the soldering iron the soldering flux has a tendency to creep up the tip of the the iron and, unless suitable precautions are taken, will penetrate the heating unit. I accordingly mount my heating unit on the iron with the sealed end next to the tip so that the soldering flux cannot penetrate the heating unit.

In Fig. 13 I have shown still another form of my invention in which the abutting edges of the heating unit along the slot or open seam 11 are closed by folds in the sheath. In this form of my invention the sheath 12 is formed from a rectangular sheet of metal. In constructing the unit, two opposite end portions 35 and 36 of the sheet are first folded over toward each other in parallel and spaced relation with the central portion, the ends of the portions meeting in abutting relation along the line or joint 37. A suitable heating element, for example, that shown in Figs. 8 and 9, is then slipped between the parallel walls thus formed, the walls compressed on the heating element, and the heating unit as thus assembled given a suitable form, such as tubular. In shaping the assembled unit into the final tubular form, the two opposite edges 38 and 39, closed by folding over the portions 35 and 36, are bent over toward each other, and in such direction that the joint 37, preferably is in the inner wall of the tube. The unit is thus open at each end but closed at the edges along the open seam 11 by the folds in the sheet. Obviously, if desired the sheet from which the sheath is formed may be developed so as to provide a projection at one or both ends of the unit, which projection may be turned or spun over so as to close the end of the unit. Also the sheath may be more effectively closed at the joint 37, for example, by inserting a sheet of metal behind the folded portions 35 and 36.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:—

1. The method of making an electric heating unit which consists in providing a sheet of heat conducting material having a rectangular portion and a portion of varying width, folding said sheet at the junction between said portions, placing a heating resistor between the folds, and then forming the whole into a double walled tubular member so that said rectangular portion constitutes the inner wall of said member, and then bending over the edges of said rectangular portion to join the double walls.

2. The method of making an electric heating unit which consists in providing a sheet of heat conducting material having a rectangular portion and a portion increasing in width from its junction with said rectangular portion, folding said sheet at the junction between said portions, placing an insulated resistance conductor between the folds, forming the whole into a double walled tube having its axis at right angles to said fold and so that said rectangular portion forms the inner wall of said tube, and then bending the sides of said rectangular portion outward so as to close the adjacent portions of said tube.

3. An electric heating unit comprising a double walled tubular member, and an insulated resistance conductor secured between the walls of said member, said resistance conductor being formed into a plurality of substantially parallel lengths extending substantially parallel with the axis of said tubular member.

4. An electric heating unit comprising a double walled tubular sheath, and a giz-zag insulated resistance conductor secured between the walls of said sheath so as to have its lengths extending longitudinally of said member.

5. The method of forming an electric heating unit which consists in folding a sheet of heat conducting material, placing an insulated resistance conductor between the folds thus formed, and then shaping the whole into a double walled tubular member having its double walls joined at one end by the fold.

6. The method of making an electric heating unit which consists in folding a sheet of heat conducting material, placing a resistance conductor between the folded portions of said sheet, and then shaping the whole into a tube such that one end of the tube is closed by the fold.

In witness whereof, I have hereunto set my hand this 16th day of December, 1922.

BERNHARD G. TANG.